(12) United States Patent
Le et al.

(10) Patent No.: US 7,716,546 B2
(45) Date of Patent: May 11, 2010

(54) SYSTEM AND METHOD FOR IMPROVED LBIST POWER AND RUN TIME

(75) Inventors: Hien Minh Le, Cedar Park, TX (US); Robert Christopher Dixon, Austin, TX (US); Luis Carlos Medina, Lago Vista, TX (US); Tung Nguyen Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 11/866,787

(22) Filed: Oct. 3, 2007

(65) Prior Publication Data

US 2009/0094496 A1    Apr. 9, 2009

(51) Int. Cl.
G01R 31/28    (2006.01)
G06F 11/00    (2006.01)

(52) U.S. Cl. .................. 714/729; 714/733; 714/739; 714/25

(58) Field of Classification Search .................. None
See application file for complete search history.

(56) References Cited

U.S. PATENT DOCUMENTS

| 5,016,263 A * | 5/1991 | Kitagawa et al. ............... 377/68 |
| 5,923,097 A | 7/1999 | Corriveau et al. |
| 6,097,241 A | 8/2000 | Bertin et al. |
| 6,816,990 B2 * | 11/2004 | Song et al. .................. 714/729 |
| 7,076,681 B2 | 7/2006 | Bose et al. |
| 7,096,433 B2 | 8/2006 | Tschanz et al. |
| 7,512,851 B2 * | 3/2009 | Wang et al. .................. 714/726 |
| 2004/0060023 A1 | 3/2004 | Bednar et al. |

FOREIGN PATENT DOCUMENTS

| EP | 0351896 A2 | 1/1990 |
| JP | 08148982 | 6/1996 |

OTHER PUBLICATIONS

Nakura, T., "Theoretical Study of Stubs for Power Line Noise Reduction," IEEE Custom Integrated Circuits Conf., 2003, p. 715-718.

* cited by examiner

*Primary Examiner*—Christine T Tu
(74) *Attorney, Agent, or Firm*—Patrick E. Caldwell, Esq.; The Caldwell Firm, LLC

(57) ABSTRACT

A method for improved Logic Built-In Self-Test (LBIST) includes providing a plurality of control signal sets, by an LBIST controller, to an LBIST domain comprising a plurality of LBIST satellite modules. Each of the plurality of LBIST satellite modules receives an individual one of the plurality of control signal sets. The LBIST controller interleaves the LBIST channel scan and LBIST sequence operations for each of the LBIST satellite modules, through the plurality of control signal sets.

A test system includes a Logic Built-In Self-Test (LBIST) domain comprising a plurality of LBIST satellite modules. An LBIST controller couples to the LBIST domain and provides a plurality of control signal sets to the LBIST domain, wherein each of the plurality of LBIST satellite modules receives an individual one of the plurality of control signal sets. The LBIST controller interleaves LBIST channel scan operations for each of the LBIST satellite modules, through the plurality of control signal sets.

20 Claims, 6 Drawing Sheets

SYSTEM AND METHOD FOR IMPROVED LBIST POWER AND RUN TIME

TECHNICAL FIELD

The present invention relates generally to the field of electronic circuit design and testing and, more particularly, to a system and method for improved LBIST power consumption and run time.

BACKGROUND OF THE INVENTION

Modern electronic devices, such as microprocessors, often include a complex matrix of logic gates arranged to perform particular tasks and functions. These logic gates are often interconnected in two parallel arrangements, one arrangement for operation, and another arrangement for testing circuit functionality. Linking a plurality of latches together into a "scan chain" is one popular method of arranging logic units for functional/operational testing. One skilled in the art will appreciate that there are a wide variety of ways to arrange circuit components that facilitate testing. As used herein, "scan chain" refers generally to an arrangement of logic units coupled together for testing.

There are also a number of popular methods to generate test data to apply to the scan chains, as will be understood to one skilled in the art. In many manufacturing environments, LBIST (Logic Built-In Self Test) is the primary test mechanism to detect non-array manufacturing defects, including both static and dynamic defects. LBIST is also a useful tool to study hardware power and frequency characteristics.

However, as the transistor count increases in modern complex chips, the power generated during a full-chip LBIST scan can become unreasonably high, exceeding tolerable levels. Further, high power dissipation and high di/dt cause unreliable LBIST results and, therefore, hardware reliability issues and difficulty in correlating LBIST with functional (performance) tests.

Conventional approaches to addressing high LBIST power and di/dt suffer from disadvantages. For example, in one approach, slowing the LBIST scan rate reduces di/dt, but increases overall test time. Longer testing time leads to higher manufacturing and testing costs. In another approach, reducing the scan load, scanning at full-load with less-random data, or removing the scan load altogether, reduces LBIST power and di/dt, but also reduces transition (alternating current (AC)) coverage. Reduced AC coverage results in a higher AC defect escape rate, reducing equipment reliability.

Therefore, there is a need for a system and/or method for LBIST testing that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved LBIST method.

It is a further aspect of the present invention to provide for an improved LBIST system.

It is a further aspect of the present invention to provide for an LBIST method and system with improved power dissipation/consumption.

It is a further aspect of the present invention to provide for an LBIST method and system with improved di/dt noise performance.

It is a further aspect of the present invention to provide for an LBIST method and system with reduced testing time.

It is a further aspect of the present invention to provide for an LBIST method and system with improved correlation with functional characterization.

The aforementioned aspects and other objectives and advantages can now be achieved as described herein. A method for improved Logic Built-In Self-Test (LBIST) includes providing a plurality of control signal sets, by an LBIST controller, to an LBIST domain comprising a plurality of LBIST satellite modules. Each of the plurality of LBIST satellite modules receives an individual one of the plurality of control signal sets. The LBIST controller interleaves the LBIST channel scan operations for each of the LBIST satellite modules, through the plurality of control signal sets.

In an alternate embodiment, a system includes a Logic Built-In Self-Test (LBIST) domain comprising a plurality of LBIST satellite modules. An LBIST controller couples to the LBIST domain and provides a plurality of control signal sets to the LBIST domain, wherein each of the plurality of LBIST satellite modules receives an individual one of the plurality of control signal sets. The LBIST controller interleaves LBIST channel scan and LBIST sequence operations for each of the LBIST satellite modules, through the plurality of control signal sets.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
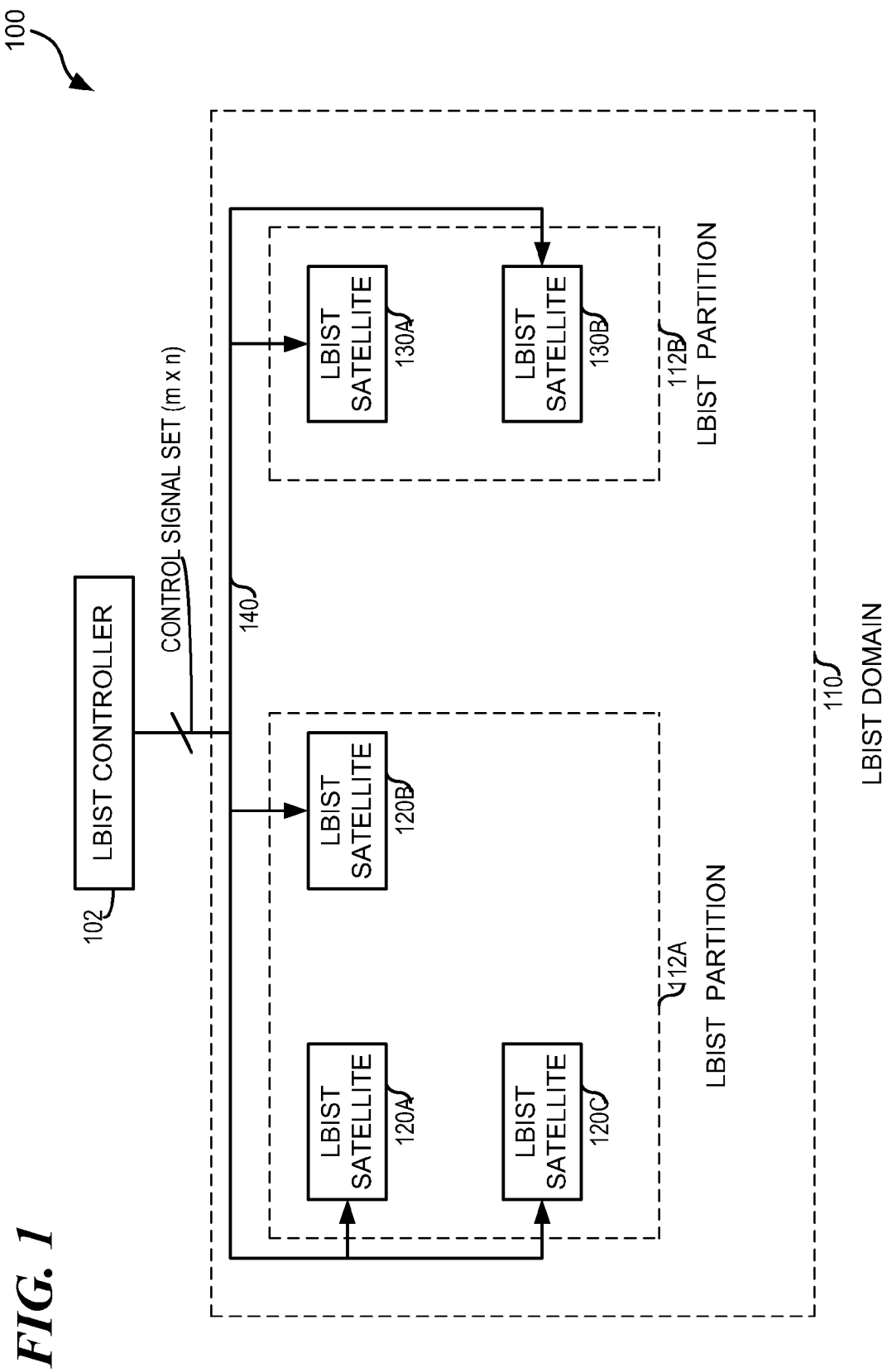
FIG. 1 illustrates a block diagram showing an LBIST system in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus or otherwise tangible medium that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain components of a system 100 for improved LBIST operations, in accordance with a preferred embodiment of the present invention. System 100 includes LBIST controller 102. LBIST controller 102 is an otherwise conventional network device driver, modified as described below.

More specifically, LBIST control 102 couples to an LBIST domain 110. Generally, an LBIST domain is a collection of circuits configured for LBIST testing, as described in more detail below. In the illustrated embodiment, LBIST domain includes two LBIST partitions 112, LBIST partition 112a and LBIST partition 112b. Each LBIST partition includes a plurality of LBIST satellites. Generally, an LBIST satellite is a subset of circuits in an LBIST domain, as described in more detail below. In the illustrated embodiment, LBIST partition 112a includes LBIST satellites 120a, 120b, and 120c. Similarly, LBIST partition 112b includes LBIST satellites 130a and 130b. Generally, an LBIST partition can contain any number of LBIST satellites, as described in more detail below.

In the illustrated embodiment, LBIST controller 102 provides a plurality of control signal sets to the LBIST satellites in LBIST domain 110. More specifically, LBIST controller 102 provides an individual control signal set to each LBIST satellite. Each control signals set comprises a plurality of control signals, described in more detail below. As used herein, "each" means all of a particular subset. In the illustrated embodiment, LBIST controller 102 provides control signal sets 140, which comprises a control signal set of "m" control signals for each of "n" LBIST satellites in LBIST domain 110. In a preferred embodiment, LBIST controller 102 provides control signals to LBIST satellites as described with reference to FIG. 2.

Figure 2:
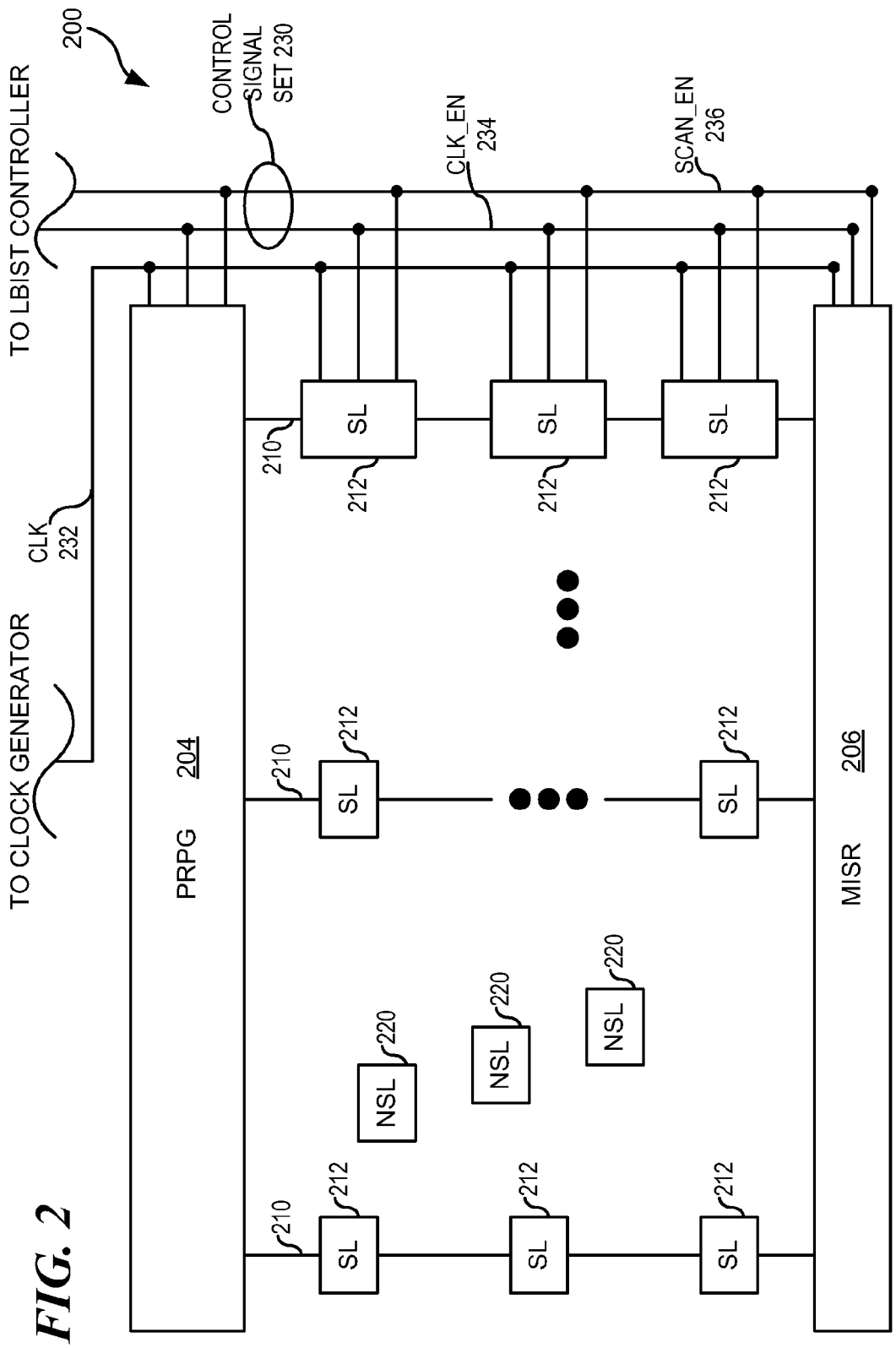
FIG. 2 illustrates a block diagram showing an LBIST satellite module in accordance with a preferred embodiment.

FIG. 2 illustrates an LBIST satellite in accordance with a preferred embodiment. Specifically, FIG. 2 illustrates an LBIST satellite 200, such as, for example, LBIST satellite 120a of FIG. 1. LBIST satellite 200 includes pseudo random pattern generator (PRPG) 204. PRPG 204 is an otherwise conventional PRPG, modified as described below.

PRPG 204 couples to a plurality of LBIST channels 210. Generally, LBIST channels are chains of scan latches 212. In a preferred embodiment, each LBIST channel comprises 2,000 latches or less. One skilled in the art will understand that each LBIST channel can comprise a varying number of scan latches 212. In the illustrated embodiment, three latches are generally shown, for ease of illustration.

In the illustrated embodiment, three LBIST channels 210 are shown. In a preferred embodiment, PRPG 204 couples to 32 LBIST channels or less. One skilled in the art will understand that the particular number of LBIST channels 210 in a specific configuration can be optimized based on the number of scan chains in the system in which the LBIST satellite 200 is deployed.

Each LBIST channel 210 couples to a multiple input shift register (MISR) 206. MISR 206 is an otherwise conventional MISR, modified as described below. Generally, MISR 206 receives input from each LBIST channel 210 and generates a SCAN_OUT signal based on the received input, as one skilled in the art will understand. LBIST satellite 200 also includes a plurality of non-scan latches (NSL) 220. Each NSL 220 is an otherwise conventional non-scan latch.

LBIST satellite 200 receives a clock signal 232 from an on-chip clock generator (not shown). Clock signal 232 is an otherwise conventional clock signal.

LBIST satellite 200 also receives a plurality of control signals from an LBIST controller. More particularly, in the illustrated embodiment, LBIST satellite 200 receives a control signal set 230. Control signal set 230 includes clock enable signal (CLK_EN) 234, and scan enable signal (SCAN_EN) 236. Clock enable signal 234 and scan enable signal 236 are otherwise conventional clock enable and scan enable signals, respectively. As shown, PRPG 204, MISR 206, and each scan latch 212 in each LBIST channel 210 receives control signal set 230 and clock signal 232.

One skilled in the art will understand that in large and complex circuit designs, a latch count of 600,000 latches is not uncommon. Accordingly, in a preferred embodiment, system 100 includes multiple LBIST satellites 200.

As described above, each LBIST satellite 200 receives an independent control signal set 230. Generally, the LBIST controller sends an independent control signal set 230 to each LBIST satellite 200 to conduct LBIST operations, as described in more detail with respect to FIG. 3 below.

Figure 3:
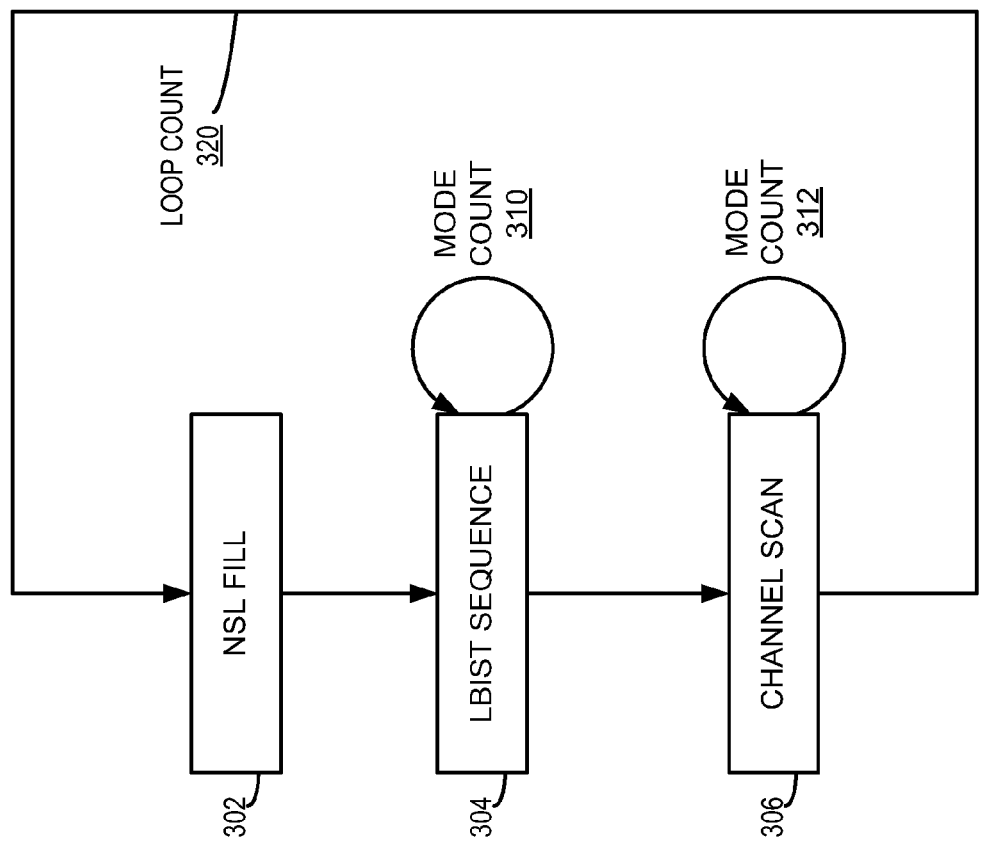
FIG. 3 illustrates a block diagram showing LBIST operations in accordance with a preferred embodiment.

FIG. 3 illustrates exemplary LBIST operations in accordance with a preferred embodiment. Specifically, FIG. 3 illustrates LBIST operations 300, as conducted on, for example, LBIST system 100 of FIG. 1, with a plurality of LBIST satellites 200 of FIG. 2. Generally, LBIST operations 300 include non-scan latch (NSL) fill operations 302, LBIST sequence operations 304, and LBIST channel scan operations 306.

Generally, NSL fill operations 302 initializes the non-scan latches with a known value. In typical NSL fill operations 302, the non-scan latches are loaded with data from one or more scan latches, as one skilled in the art will understand. In a preferred embodiment, the LBIST controller performs NSL fill operations 302 for all of the LBIST satellites substantially contemporaneously. As used herein, "contemporaneous" or "contemporaneously" means at the same clock time, or at or near the same real time and/or clock cycle.

Typically, the LBIST controller performs NSL fill operations 302 for a small number of clock cycles, relative to LBIST sequence operations 304 and LBIST channel scan operations 306, generally not exceeding the maximum depth of non-scan latches in the system. Accordingly, one skilled in the art will understand that power and di/dt fluctuations during NSL fill operations 302 are generally very small, in part because the ratio of non-scan latches to the total latch count is ordinarily very small.

Generally, LBIST sequence operations 304 mimic a normal functional mode of the latches in each LBIST channel. As such, one skilled in the art will understand that typical LBIST sequence operations 304 run for a number of clock cycles based on the maximum depth of scan latches in the system. In one embodiment, LBIST sequence operations 304 comprise at most 16 clock cycles.

In one embodiment, LBIST sequence operations 304 include at-speed AC transitions. As described above, in one embodiment, after NSL fill operations 302, the system is configured in a known state. As such, during LBIST sequence operations 304, the LBIST controller allows the logic under test to clock (capture data) to test the normal operating logic paths at normal operating speed. In order to achieve a large amount of transition (AC) coverage, in one embodiment, LBIST sequence operations 304 begin with a shifting (skew-load) of all latches in all LBIST channels, followed by multiple functional captures.

In prior art systems, if the entire chip under test scans at the same time, that is, contemporaneously, at the operating clock rate (the equivalent of conducting LBIST sequence operations 304 on all LBIST satellites of the present invention at once), skew load from the LBIST sequence operations causes unrealistic switching activities on the chip. This unrealistic switching activity causes instantaneous power fluctuations that fall outside the power budget and normal operating range for the chip. Consequently, entire-chip LBIST operations in prior art systems often experience high di/dt noise and unexpected voltage droops. These effects manifest in prior art systems as unrealistically low LBIST performance and unreliable system diagnostics.

Furthermore, besides use as a test vehicle, LBIST operations can also operate as a speed sort tool. As such, it is an object of the present invention to improve the correlation between LBIST performance and actual functional workload performance of the circuit under test. Additionally, the LBIST controller can perform LBIST operations as a hardware based cycle time tool (HBCT). That is, the LBIST controller can employ LBIST operations to identify critical time paths and AC defects on the hardware, by identifying bad paths. System designers can then use the timing critical path information to improve cycle time of the design and use the AC defect information for diagnostic and failure analyses.

As described above, one approach to managing high instantaneous power and di/dt fluctuations due to skew load is to avoid employing skew load altogether. This approach suffers from the obvious disadvantage that benefits of skew load testing must also be forgone along with the unmanageable transient operating conditions during LBIST operations. Also, as described above, another approach is to force the test data into a less random pattern. This approach reduces the AC transition coverage of the LBIST pattern, making the LBIST operations substantially ineffective. As described in more detail below, in a preferred embodiment, system 300 reduces high instantaneous power and di/dt fluctuations without also incurring the disadvantages associated with prior art systems and methods.

In the illustrated embodiment, LBIST sequence operations 304 repeat for a predetermined number of repetitions, designated in FIG. 3 as mode count 310. One skilled in the art will understand that the particular mode count 310 can vary based on the configuration of the system in which LBIST operations are conducted.

In the illustrated embodiment, LBIST operations 300 include LBIST channel scan operations 306. As shown, LBIST channel scan operations 306 follow LBIST sequence operations 304. Generally, during LBIST channel scan operations 306, the LBIST controller scans out and captures the results from LBIST sequence operations 304 into the MISR. Contemporaneously, the LBIST controller scans the random data generated by the PRPG into the scan latches, to prepare for the next LBIST loop.

In the illustrated embodiment, LBIST channel scan operations 306 repeat for a predetermined number of repetitions, designated in FIG. 3 as mode count 312. One skilled in the art will understand that the particular mode count 312 can vary based on the configuration of the system in which LBIST operations are conducted. Additionally, in the illustrated embodiment, LBIST operations 300 repeat for a predetermined number of repetitions, designated in FIG. 3 as loop count 320. One skilled in the art will understand that the particular loop count 320 can vary based on the configuration of the system in which LBIST operations are conducted.

In one embodiment, LBIST channel scan operations 306 are the most time consuming and power demanding component of LBIST operations 300. For example, during LBIST channel scan operations 306, the LBIST controller scans through an entire LBIST channel of length "L", which, in one embodiment, normally includes 1000 to 2000 latches, as described above. In prior art systems, if all the LBIST channels in the entire chip under test scan at the same time, that is, contemporaneously, at the operating clock rate (the equivalent of conducting LBIST channel scan operations 306 on all LBIST satellites of the present invention at once), the power will exceed the designed power level. One skilled in the art will understand that the designed power level in most systems is based on an assumption that only a fraction of the chip will switch at any given cycle, an assumption that does not hold when the entire chip under test is scanned contemporaneously. These effects, like the effects of prior art LBIST sequence operations, also manifest in prior art systems as unrealistically low LBIST performance and unreliable system diagnostics.

As described above, one approach to managing this power surge is to operate the channel scan at a much lower rate than the circuit allows. This approach suffers from the obvious disadvantage that LBIST operations can therefore become unacceptably lengthy. For example, depending on the size of the system design under test, the reduced channel scan rate can be a fourth, an eighth, a 16th, or even a 32nd of the normal operating clock frequency. As described in more detail below, in a preferred embodiment, system 300 reduces these power surges without also incurring the disadvantages associated with prior art systems and methods.

Figure 4:
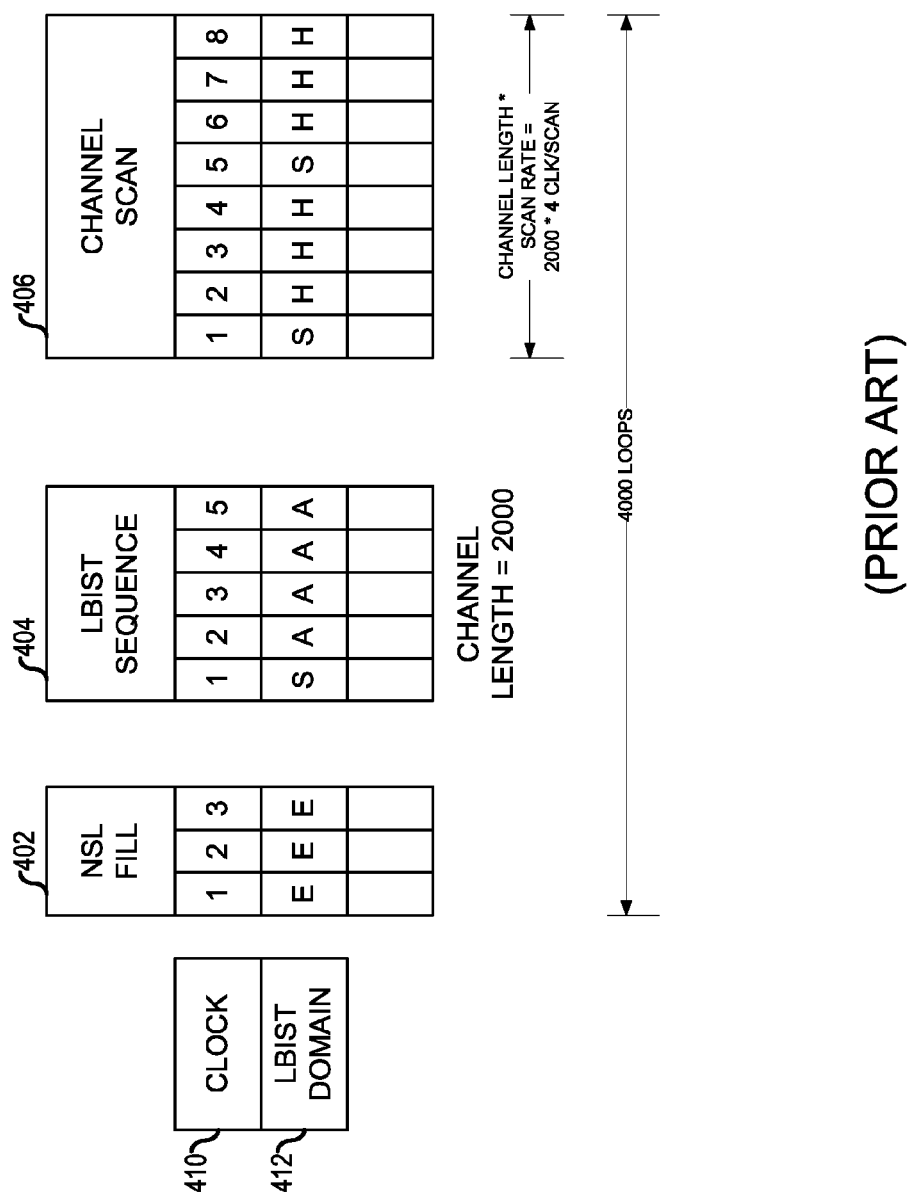
FIG. 4 illustrates a block diagram showing LBIST operations in accordance with the Prior Art.

FIG. 4 illustrates one such prior art approach. Specifically, prior art system 400 includes NSL fill operations 402, LBIST sequence operations 404, and LBIST channel scan operations 406. Prior art system 400 includes a clock 410, with clock cycles shown horizontally. As described above, in prior art systems, the entire LBIST domain, represented in FIG. 4 as LBIST domain 412, receives a single control signal set.

In one embodiment, the letters represent, generally, the following operations: E=NSL latch fill; S=scan shift; A=capture; and H=hold, as one skilled in the art will understand.

In the example prior art system 400, the assumed channel length is 2000 latches, and the assumed loop value is 4000. Additionally, the assumed power budget for prior art system 400 is 25% switching during normal operation. As such, in prior art system 400 the entire LBIST domain 412 scans at the same time, but at one-fourth of the normal operational rate, in order to avoid exceeding the allowed power budget. One skilled in the art will understand that LBIST data are ordinarily somewhat random, statistically, and therefore the scan can nevertheless cause 50 percent switching activity despite the reduced operational rate. Accordingly, in prior art system 400, channel scan operations run every fourth cycle, because the current spike caused by the data shift makes the power supply drops so low that prior art system 400 requires extra time for recovery.

Moreover, in order to contain the di/dt fluctuations in the first clock cycle of LBIST sequence operations 404, the LBIST controller intentionally uses less random LBIST data. Thus, the prior art system 400 pattern effectiveness is greatly reduced for each pattern, and therefore, prior art system 400 requires relatively more LBIST patterns.

As shown, prior art system 400 requires 20,000 clock cycles to complete LBIST sequence operations 404 (5*4000). Also, prior art system 400 requires 32 million clock cycles to complete LBIST channel scan operations 406 (4*2000*4000). As described in more detail below, the embodiments of the present invention described herein provide numerous advantages over prior art system 400.

Figure 5:
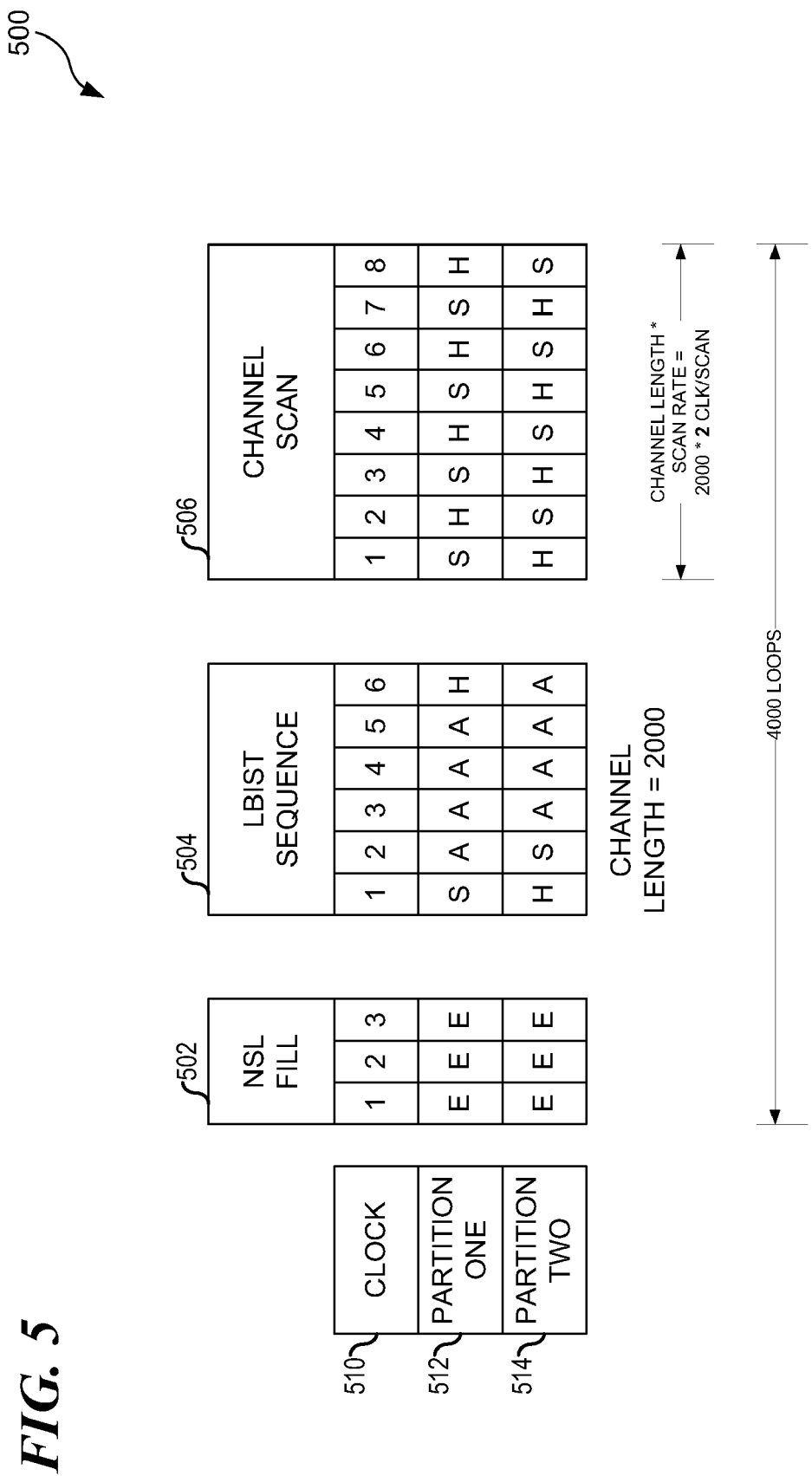
FIG. 5 illustrates a block diagram showing LBIST operations in accordance with a preferred embodiment.

FIG. 5 illustrates an improved LBIST system in accordance with one embodiment of the present invention. Specifically, system 500 includes NSL fill operations 502, LBIST sequence operations 504, and LBIST channel scan operations 506. System 500 includes a clock 510, with clock cycles shown horizontally. As described above, each LBIST satellite in system 500 receives an individual control signal set. In one embodiment, the LBIST satellites are grouped into partitions, as described above. In the illustrated embodiment, the LBIST satellites are grouped into two partitions, represented in FIG. 5 as LBIST partition "one" 512 and LBIST partition "two" 514.

As in the example prior art system 400, the assumed channel length in system 500 is 2000 latches and the assumed loop value is 4000. Additionally, the assumed power budget for system 500 is also 25% switching during normal operation. However, in system 500, with two separate control signal sets, latch shifting is interleaved, which helps maintain the AC transition power and di/dt fluctuations at an acceptable level based on the chip design. More particularly, in the illustrated embodiment, the LBIST controller scans only half of the total LBIST domain (that is, a partition) at any given clock cycle.

In the illustrated embodiment, the LBIST controller interleaves the LBIST sequence operations 504 for partition 512 and partition 514. For example, during the first clock cycle, partition 512 scans while partition 514 holds. Similarly, during the sixth clock cycle, partition 512 holds while partition 514 captures.

Likewise, the LBIST controller also interleaves the LBIST channel scan operations 506 for partition 512 and partition 514. For example, during odd-numbered clock cycles, partition 512 scans while partition 514 holds. Similarly, during even-numbered clock cycles, partition 512 holds while partition 514 scans.

The particular interleaving pattern depicted in FIG. 5 is an exemplary interleaving pattern. One skilled in the art will understand that providing individual control signal sets for each LBIST satellite allows a variety of advantageous interleaving patterns. Accordingly, the particular interleaving pattern can be selected to optimize power constraints or other suitable factors. Therefore, has used herein, "interleaving" means any of a plurality of methods to alternate between enabled scans for each LBIST partition and/or satellite in the system under test.

Configured as illustrated, system 500 uses 24,000 clock cycles to complete LBIST sequence operations 504 (6*4000) and 16 million clock cycles to complete LBIST channel scan operations 506 (2*2000*4000). Thus, the embodiment of the present invention shown in system 500 provides numerous advantages over prior art system 400, not least of which is a significant reduction in the number of clock cycles required to complete LBIST operations.

Figure 6:
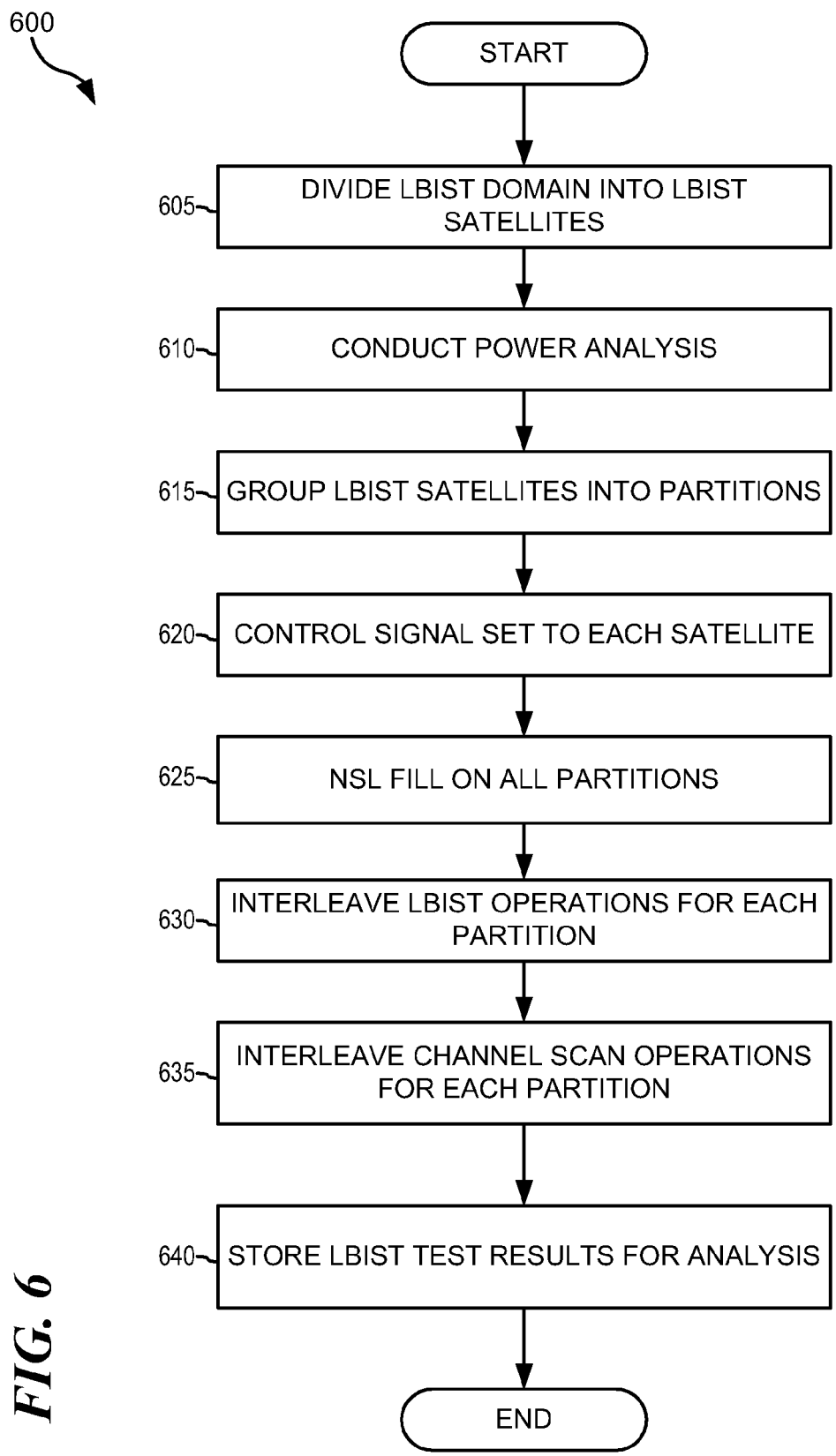
FIG. 6 illustrates a high-level flow diagram depicting logical operational steps of an improved LBIST method, which can be implemented in accordance with a preferred embodiment.

System 500 also provides other advantages over prior art systems. First, AC transition power and di/dt fluctuations remain at manageable levels during LBIST operations. Second, improved system 500 typically saves tester time, or at least generally does not increase tester time over prior art systems. Third, system 500 accomplishes these advantages without substantially degrading the coverage or analysis value of the overall LBIST operations. FIG. 6 describes this improved approach to LBIST operations in additional detail.

FIG. 6 illustrates one embodiment of a method for improved LBIST operations. Specifically, FIG. 6 illustrates a high-level flow chart 600 that depicts logical operational steps performed by, for example, system 100 of FIG. 1, which may be implemented in accordance with a preferred embodiment. Generally, a design engineer or the LBIST controller 102 performs the steps of the method, unless indicated otherwise.

As indicated at block 605, the process begins, wherein a design engineer (or other suitable actor) divides the LBIST domain under test into a plurality of LBIST satellites. For example, system 100 includes five illustrated LBIST satellites. Next, as illustrated at block 610, the design engineer conducts power analysis on the system under test. In a preferred embodiment, the power analysis indicates the power generated by each LBIST satellite.

Next, as illustrated at block 615, the design engineer groups the LBIST satellites into LBIST partitions, based on the power analysis of the previous step. In a preferred embodiment, the design engineer groups the LBIST satellites into "N" LBIST partitions such that each LBIST partition draws a roughly similar power level. In a preferred embodiment, there are two or four LBIST partitions in the system.

Next, as illustrated at block 620, the LBIST controller sends a control signal set to each LBIST satellite. In an alternate embodiment, the LBIST controller sends a control signal set to each LBIST partition.

Next, as indicated at block 625, the LBIST controller conducts NSL fill operations on all LBIST partitions. As described above, in a preferred embodiment, the LBIST controller conducts NSL fill operations on all LBIST partitions substantially contemporaneously.

Next, as indicated at block 630, the LBIST controller interleaves LBIST sequence operations for each LBIST partition. Next, as indicated at block 635, the LBIST controller interleaves LBIST channel scan operations for each LBIST partition.

Next, as indicated at block 640, the LBIST controller stores LBIST test results for analysis, and the process ends. In one embodiment, the LBIST controller directs each LBIST satellite to scan data from its MISR out to a storage medium.

In one embodiment, the LBIST operations generate LBIST test results, which can be employed to achieve a variety of design, testing, and diagnostic aims, as one skilled in the art will understand. For example, as described above, in one embodiment, the system can use the LBIST test results to determine a hardware base cycle time. In another embodiment, the system can use the LBIST test results to "speed sort" the LBIST domain, that is, to determine a functional operating point based on the LBIST test results. In another embodiment, the system can correlate LBIST test results with results from other testing operations, such as, for example, functional tests, functional test suites, performance tests, and/or other suitable tests. As used herein, "other testing operations" includes functional tests, functional test suites, performance tests, and/or other suitable tests. One skilled in the art will understand that the improved LBIST operations disclosed herein therefore also improve the quality and efficiency of a wide variety of related operations.

Accordingly, the above disclosed embodiments provide numerous advantages over other methods and systems. As described above, the disclosed embodiments improve AC transition power and di/dt fluctuation without significant reduction in LBIST testing performance or quality.

It will be appreciated that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method for improved Logic Built-In Self Test (LBIST), comprising:
    providing a plurality of control signal sets, by an LBIST controller, to an LBIST domain comprising a plurality of LBIST satellite modules;
    wherein each of the plurality of LBIST satellite modules receives an individual one of the plurality of control signal sets; and
    interleaving LBIST channel scan operations for each of the LBIST satellite modules, by the LBIST controller, though the plurality of control signal sets;
    wherein each LBIST satellite module includes:
        a pseudo random pattern generator (PRPG),
        a plurality of scan latches coupled to the PRPG, the plurality of scan latches arranged into at least two LBIST channels, and
        a multiple input shift register (MISR) coupled to the plurality of scan latches; and
    wherein interleaving comprises:
    for a first period, enabling scan operations for a first group of LBIST satellite modules and disabling scan operations for a second group of LBIST satellite modules, and
    for a second period, disabling scan operations for the first group of LBIST satellite modules and enabling scan operations for the second group of LBIST satellite modules.

2. The method of claim 1, wherein each control signal set comprises a clock enable (clock-en) signal and a scan enable (scan-en) signal.

3. The method of claim 1, further comprising interleaving LBIST sequence phase operations for each of the LBIST satellite modules, by the LBIST controller, through the plurality of control signal sets.

4. The method of claim 1, further comprising performing contemporaneous non-scan latch (NSL) fill operations for a partition of the LBIST domain.

5. The method of claim 1, further comprising forming the plurality of LBIST satellite modules by dividing the LBIST domain into the plurality of LBIST satellite modules, wherein the LBIST domain comprises logic circuitry on a single integrated circuit (IC) chip.

6. The method of claim 1, further comprising grouping the plurality of LBIST satellite modules into a plurality of partitions.

7. The method of claim 6, wherein grouping comprises power analysis.

8. The method of claim 6, wherein the plurality of partitions comprises two partitions.

9. The method of claim 6, wherein the plurality of partitions comprises four partitions.

10. The method of claim 1, wherein each LBIST satellite module comprises thirty-two LBIST channels.

11. The method of claim 10, wherein each LBIST channel comprises less than 2,000 latches.

12. A system, comprising:
    a Logic Built-In Self-Test (LBIST) domain comprising a plurality of LBIST satellite modules, wherein each LBIST satellite module includes:
        a pseudo random pattern generator (PRPG),
        a plurality of scan latches coupled to the PRPG, the plurality of scan latches arranged into at least two LBIST channels, and
        a multiple input shift register (MISR) coupled to the plurality of scan latches;
    an LBIST controller coupled to the LBIST domain, the LBIST controller configured to provide a plurality of control signal sets to the LBIST domain, wherein each of the plurality of LBIST satellite modules receives an individual one of the plurality of control signal sets; and
    the LBIST controller further configured to interleave LBIST channel scan operations for each of the LBIST satellite modules, through the plurality of control signal sets;
    wherein interleaving comprises:

for a first period, enabling scan operations for a first group of LBIST satellite modules and disabling scan operations for a second group of LBIST satellite modules, and for a second period, disabling scan operations for the first group of LBIST satellite modules and enabling scan operations for the second group of LBIST satellite modules.

13. The system of claim 12, wherein each control signal set comprises a clock enable (clock-en) signal and a scan enable (scan-en) signal.

14. The system of claim 12, wherein the LBIST controller is further configured to interleave LBIST sequence phase operations for each of the LBIST satellite modules, through the plurality of control signal sets.

15. The system of claim 12, further comprising performing contemporaneous non-scan latch (NSL) fill operations for a partition of the LBIST domain.

16. The system of claim 12, wherein the LBIST domain further comprises a plurality of partitions, each partition comprising a subset of the plurality of LBIST satellite modules.

17. The system of claim 12, wherein each LBIST satellite module comprises thirty-two LBIST channels, and wherein each LBIST channel comprises less than 2,000 latches.

18. A computer program product comprising a computer useable medium including a computer readable program, wherein the computer readable program when executed on a computer causes the computer to:

provide a plurality of control signal sets, by an LBIST controller, to an LBIST domain comprising a plurality of LBIST satellite modules;

wherein each of the plurality of LBIST satellite modules receives an individual one of the plurality of control signal sets; and interleave LBIST channel scan operations for each of the LBIST satellite modules, by the LBIST controller, though the plurality of control signal sets;

wherein each LBIST satellite module includes:

a pseudo random pattern generator (PRPG), a plurality of scan latches coupled to the PRPG, the plurality of scan latches arranged into at least two LBIST channels, and a multiple input shift register (MISR) coupled to the plurality of scan latches; and wherein interleaving comprises:

for a first period, enabling scan operations for a first group of LBIST satellite modules and disabling scan operations for a second group of LBIST satellite modules, and for a second period, disabling scan operations for the first group of LBIST satellite modules and enabling scan operations for the second group of LBIST satellite modules.

19. The computer program product of claim 18, wherein the computer readable program when executed on a computer further causes the computer to interleave LBIST sequence phase operations for each of the LBIST satellite modules, by the LBIST controller, though the plurality of control signal sets.

20. The computer program product of claim 18, wherein the computer readable program when executed on a computer further causes the computer to perform contemporaneous non-scan latch (NSL) fill operations for a partition of the LBIST domain.

* * * * *